May 24, 1966  J. VAN POOL  3,253,054
ALKYLATE PRODUCTION USING ORGANIC FLUORIDES
Filed Sept. 24, 1963
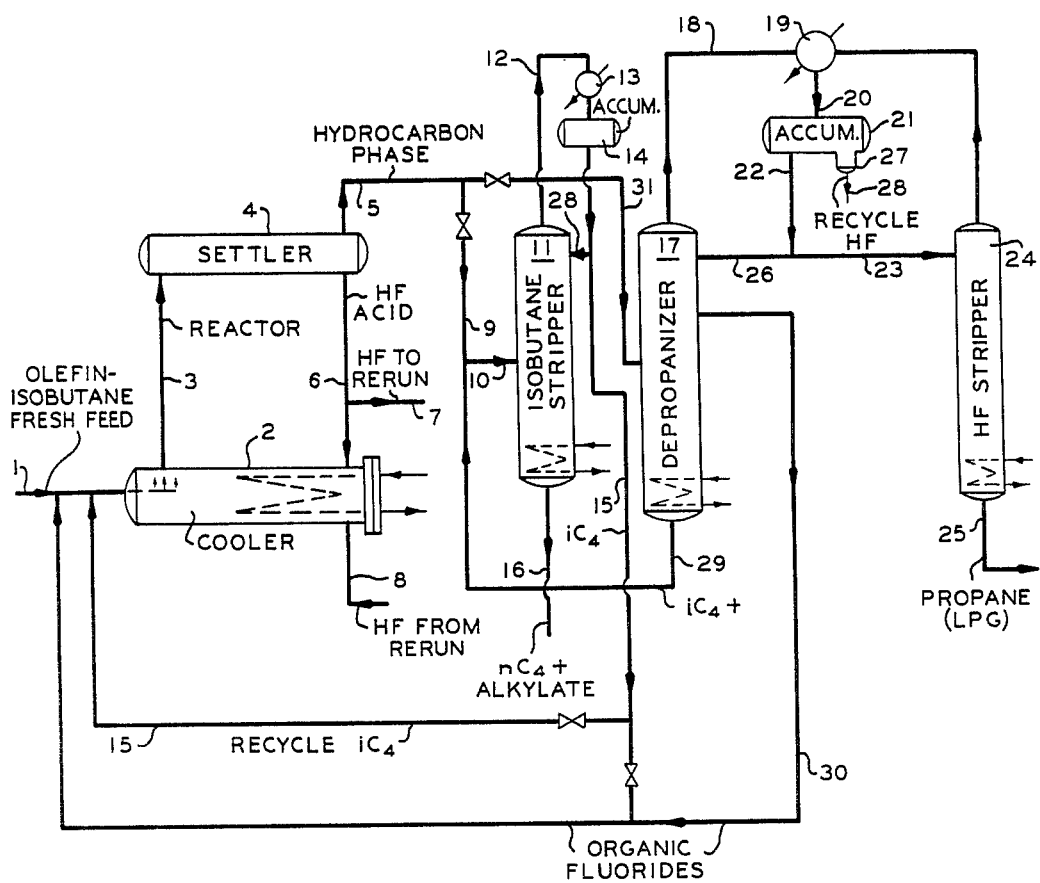
INVENTOR.
JOE VAN POOL
BY
*Young & Zugg*
ATTORNEYS

United States Patent Office 3,253,054
Patented May 24, 1966

3,253,054
ALKYLATE PRODUCTION USING ORGANIC FLUORIDES
Joe Van Pool, Bartlesville, Okla., assignor to Phillips Petroleum Company, a corporation of Delaware
Filed Sept. 24, 1963, Ser. No. 311,058
4 Claims. (Cl. 260—683.48)

This invention relates to improved alkylate production using organic fluorides. In one of its aspects, the invention relates to the production of an improved alkylate product in an isoparaffin-olefin alkylation employing hydrofluoric acid as a catalyst wherein alkyl fluorides which are separated in the operation are added to the feed to the alkylation reaction. In another of its aspects, this invention relates to an improved alkylation operation wherein alkyl fluorides which are formed during the alkylation reaction are separated from the reaction effluent and recycled into admixture with at least a portion of the feed to said reaction.

I have now found that the organic fluoride concentrate which can be recovered from an alkylation operation and which contains isopropyl and/or isobutyl fluoride will, if admixed with the feed to the alkylation reaction, yield an improved alkylate product, as well as other advantages which will be apparent to one skilled in the art in possession of this disclosure having studied the same.

It is an object of this invention to provide an improved alkylation operation. It is another object of this invention to provide an improved alkylate product. It is a further object of this inventaion to provide for the separation and effective use of organic or alkyl fluorides which are obtained in an alkylation, for example an alkylation of an isoparaffin with an olefin in the presence of hydrofluoric acid.

Other aspects, objects and the several advantages of this invention are apparent from a study of this disclosure, the drawing and the appended claims.

According to the present invention, organic fluoride generated in the production of alkylate in an alkylation operation, for example in the alkylation of an isoparaffin such as isobutane with an olefin feed, for example a butylene or a propylene-butylene stream, the alkylation being performed in the presence of hydrofluoric acid as a catalyst, is admixed with at least a portion of the feed to the alkylation reaction zone whereby improved operating efficiency, as well as product characteristics, are obtained.

In Serial No. 188,019, filed by Robert D. Bauer and Joe Van Pool, April 17, 1962, there is disclosed, described and claimed a method for alkylating an alkylatable compound with an alkylating compound in the presence of hydrofluoric acid wherein organic fluorides are formed and tend to concentrate in the system which comprises passing a stream containing said fluorides to a fractionation operation, therein concentrating the fluorides, and removing the fluorides from said fractionation operation. In the said application for patent, the fluorides are returned to the alkylation operation.

In Serial No. 158,233, filed December 11, 1961, now Patent No. 3,190,935 by Thomas Hutson, Jr. there is disclosed, described and claimed a method for removal of alkyl fluorides from propane and normal butane which comprises introducing said propane and normal butane into a reaction zone wherein isobutane is being alkylated with an olefin in the presence of HF catalyst, subjecting said introduced material to the conditions of alkylation and subsequently recovering the thus purified propane and normal butane free from alkyl fluoride content. The propane or butane can be separately treated. Other details are given.

In the present invention, the organic fluorides stream or concentrate is injected into or admixed with the fresh feed being charged to the alkylation zone. Specifically, in one embodiment of the invention which is now preferred, the stream containing fluorides is mixed with the recycle isoparaffin or isobutane containing stream which is fed to the alkylation zone before this recycle stream is injected or passed into said alkylation zone. This operation provides benefits through increased octane number and other advantages which are evident from a study of this disclosure. For example, in the following which is a comparison of results from alkylating similar catalytic cracker olefin feed stocks in similar reactors, all on a comparable basis, it can be noted that the research octane plus 3 cc. tetraethyl lead is increased by two numbers from 103 to 105.

| Operation | RON+3 cc. TEL | Reactor Temp., °F. | iC⁴/Olefin Mol Ratio |
|---|---|---|---|
| Unit KC | ¹ 103. 0 | 82–88 | 15–17 |
| Unit WC | ² 105. 0 | 84–90 | 14–15 |

¹ Alkyl fluorides added directly to reactor.
² Alkyl fluorides added to olefin-isobutane feed stream.

It is known that in the alkylation of isobutane with olefin, such as propylene or butylene, butylene which may contain some propylene, there is formed propane unavoidably. In Serial No. 188,019, above identified, there is obtained from the fractionation operation wherein propane is removed a fluoride containing cut or concentrate. This cut or concentrate is, according to the present invention, admixed with a feed to the alkylation reactor rather than returning it directly to the alkylation operation as described in said identified application.

Referring now to the drawing, an olefin-isobutane fresh feed, in this instance a butylene-propylene-isobutane feed, is passed by 1 into cooler 2 and by way of reaction leg 3 into settler 4. In settler 4, alkylated hydrocarbon liquid phase 5 is taken off as an upper phase while acid is returned by way of 6 to cooler 2. As shown, a portion of the used acid is passed by way of 7 to a rerun operation and returned from the rerun operation by way of 8. The rerun operation forms no part of this invention except as it is embodied therein.

Hydrocarbon phase passes by 5 and valved pipe 9 and pipe 10 to isobutane stripper 11 which functions to separate isobutane overhead passing by 12, condenser 13, accumulator 14 and 15 to 1 and ultimately to cooler 2 for reuse. The stripper 11 also functions to separate normal butane and alkylate product at 16. A portion of the hydrocarbon phase in 5 is passed by valved line 31 to depropanizer 17 which functions to remove propane and HF from the operation by way of 18, condenser 19 and 20 and accumulator 21, from which propane passes by 22 and 23 into stripper 24 from the bottom of which propane or liquefied propane gas is passed from the operation at 25. As shown, a portion of the liquefied accumulator 21 bottoms is returned to depropanizer 17 as reflux therefor, entering by way of 26. Recycle HF acid is removed from accumulator 21 by way of keg 27 and pipe 28. For sake of completeness, it is noted that a portion of accumulator 14 bottoms is returned to isobutane stripper by way of 28 as reflux therefor. Bottoms from depropanizer 17 containing essentially isobutane are passed by 29 and 10 to isobutane stripper 11. An intermediate fraction from depropanizer 17 taken off at the place at which organic fluorides concentrate, as described in the above-identified application for patent, are passed by 30 to pipe 1. In this embodiment, it is preferred to pass the organic fluorides into the olefin-isobutane fresh feed prior to admixture of the fresh feed with the recycle isobutane. It appears that the organic fluorides somehow react with the olefin-isobutane fresh feed, even before the acid catalyst is admixed therewith in reactor 3, to influence the octane number of the final alkylate product. It cannot be stated with absolute certainty just how the organic or alkyl fluorides influence the course of the ensuing reaction in the presence of the acid catalyst. Nevertheless, data show that there is obtained an improvement in the octane number and the overall efficiency of the operation, especially in the reduction of post treatment for removal of fluorine of the products of the operation. It will be especially noted that complete admixture of the organic fluorides of pipe 30 and the recycle isobutane of pipe 15 takes place before the composite reaches cooler 2 or reactor 3, where HF catalyst is present.

The following tabular information will be helpful for a more full understanding of the operation which has just been described.

EXAMPLE

|  | Unit KC | Unit WC |
|---|---|---|
| Fresh Feed (1): |  |  |
| Propylene, Barrels/Day | 480 | 480 |
| Propane, Barrels/Day | 160 | 160 |
| Isobutane, Barrels/Day | 160 | 160 |
| Butenes, Barrels/Day | 640 | 640 |
| Normal Butane, Barrels/Day | 160 | 160 |
| Recycle Isobutane (15): |  |  |
| Propane, Barrels/Day | 180 | 150 |
| Isobutane, Barrels/Day | 18,000 | 15,000 |
| Normal Butane, Barrels/Day | 740 | 617 |
| Organic Fluoride Containing Stream (30)[1]: |  |  |
| Propane, Barrels/Day | 520 | 520 |
| Isopropyl fluoride, Mols/Day | 1.3 | 1.3 |
| Isobutane, Barrels/Day | 510 | 510 |
| Alkylate Product (Butane-free): |  |  |
| Barrels/Day | 1,920 | 1,920 |
| Research Octane No., w./3 cc. TEL | 103.0 | 105.0 |
| Isobutane/Olefin Mol. Ratio | 16:1 | 15:1 |
| HF Acid/Hydrocarbon Vol., Ratio | 6:1 | 6:1 |
| Reactor Temperature, °F.[2] | 86 | 86 |
| Contact time, seconds | 35 | 35 |

[1] NOTE:

|  |  |  |
|---|---|---|
| Charged to Feed (1) | No | Yes |
| Charged to Reactor (3) | Yes | No |

[2] And pressure to maintain liquid phase.

It is within the scope of the invention to admix at least a portion, if not all, of the organic fluorides with the recycle isobutane before the recycle isobutane is passed to cooler 2. Indeed, the recycled, separated fluorides concentrate may be injected into admixture with the fresh feed olefin and/or the recycle isobutane. However, mixing with the olefin feed which contains isobutane, as described in connection with the drawing, is now considerably preferred over the addition of the fluorides to the acid since it is desired that the fluorides react with the olefins prior to contacting HF catalyst in alkylation reaction zone.

It will be noted that this invention can be practiced with alkyl fluorides, that is to say, organic fluorides obtained from any source, but, in its preferred form, utilizes a concentrate of alkyl or organic fluorides obtained within the operation as being the preferred organic materials which are now known to importantly and desirably influence the course of the ensuing reaction in the alkylation reaction zone.

Interestingly enough, the return of the relatively small amount of the fluorides separated in the operation tends to yield the same type of octane number improvement as is obtained by pre-fluorination of all of the olefin feed.

Reasonable variation and modification are possible within the scope of the foregoing disclosure, drawing and the appended claims to the invention the essence of which is that organic fluorides, more specifically alkyl fluorides, separated in an alkylation reaction, for example in the alkylation of an isoparaffin with an olefin in the presence of hydrofluoric acid, are passed to the feed to the alkylation reaction for admixture with said feed prior to said alkylation reaction.

I claim:

1. A method for alkylating an alkylatable compound with an alkylating compound in the presence of hydrofluoric acid wherein organic fluorides are formed and tend to concentrate in the system which comprises passing a stream containing said fluorides to a fractionation operation, therein concentrating the fluorides, removing the fluorides from said fractionation operation and admixing said removed fluorides with at least a portion of the fresh feed to said alkylation operation prior to introducing said fresh feed to said alkylation operation.

2. A method for alkylating an alkylatable compound with an alkylating compound in the presence of hydrofluoric acid wherein organic fluorides are formed which comprises recovering said organic fluorides and admixing the same with at least a portion of the fresh feed to the alkylation operation prior to introducing said fresh feed to said alkylation operation.

3. An alkylation operation which comprises the steps as follows: alkylating an alkylatable compound with an alkylating compound in the presence of hydrofluoric acid catalyst, separating acid catalyst phase from alkylate thus produced, fractionating alkylate thus produced to obtain a stream containing low boiling hydrocarbons, hydrofluoric acid and organic fluorides, fractionating said stream containing said low boiling hydrocarbons, hydrofluoric acid and alkyl fluorides, obtaining as an overhead low boiling hydrocarbons and hydrogen fluoride and as bottoms a higher boiling hydrocarbon, withdrawing a side stream containing a high concentration of organic fluorides to the operation by way of admixing said fluorides with at least a portion of the fresh feed to said operation prior to introducing said fresh feed to said alkylation operation.

4. An alkylation of an isoparaffin with an olefin in the presence of hydrofluoric acid which comprises the steps as follows: feeding an isoparaffin-olefin mixture to a cooling zone, also feeding to said cooling zone used hydrofluoric acid separated from an alkylate later produced, admixing in said cooling zone the fresh feed and the used acid, passing the mixture thus obtained through a reaction zone and from said reaction zone to a settler, obtaining from the settler a hydrocarbon phase and said used acid, treating said hydrocarbon phase to recover a stream containing organic fluorides therefrom, and admixing said recovered stream containing organic fluorides with at least a portion of the fresh feed to said cooling zone prior to passing said fresh feed into said cooling zone.

References Cited by the Examiner

UNITED STATES PATENTS

| 2,434,000 | 1/1948 | Matusak | 260—683.49 |
| 2,441,103 | 5/1948 | Meadows | 260—683.51 |
| 2,914,590 | 11/1959 | Van Pool | 260—683.48 X |
| 3,073,877 | 1/1963 | Sherk | 260—683.48 |

OTHER REFERENCES

Gorin et al.: Mechanism of Catalyzed Alkylation of Isobutane with Olefins, Ind. and Engr. Chem., vol. 38, No. 8, August 1946, pp. 795–799.

Kobe and McKetta: Advances in Petroleum Chemistry and Refining, vol. I, Interscience, N.Y., 1958, pp. 348–350.

DELBERT E. GANTZ, *Primary Examiner.*

ALPHONSO D. SULLIVAN, *Examiner.*